United States Patent
Tsai

(10) Patent No.: US 9,197,111 B2
(45) Date of Patent: Nov. 24, 2015

(54) WORK OUTPUT DEVICE

(71) Applicant: Jui-An Tsai, Taoyuan (TW)

(72) Inventor: Jui-An Tsai, Taoyuan (TW)

( * ) Notice: Subject to any disclaimer, the term of this patent is extended or adjusted under 35 U.S.C. 154(b) by 247 days.

(21) Appl. No.: 14/074,330

(22) Filed: Nov. 7, 2013

(65) Prior Publication Data

US 2014/0159523 A1   Jun. 12, 2014

(30) Foreign Application Priority Data

Dec. 11, 2012   (TW) .............................. 101224002 U

(51) Int. Cl.
| | | |
|---|---|---|
| *H02K 7/10* | (2006.01) | |
| *H02K 49/00* | (2006.01) | |
| *H02K 7/116* | (2006.01) | |
| *H02K 53/00* | (2006.01) | |
| *H02K 16/02* | (2006.01) | |

(52) U.S. Cl.
CPC ................ *H02K 7/116* (2013.01); *H02K 53/00* (2013.01); *H02K 16/02* (2013.01)

(58) Field of Classification Search
CPC .................................. H02K 7/16; H02K 16/02
USPC ........................................ 310/83, 96–99, 101
See application file for complete search history.

(56) References Cited

U.S. PATENT DOCUMENTS

| | | | | |
|---|---|---|---|---|
| 5,372,419 A | * | 12/1994 | Hagiwara et al. ....... | B29B 7/183 366/100 |
| 2011/0162617 A1 | * | 7/2011 | Zhang ..................... | F01C 1/077 123/200 |

FOREIGN PATENT DOCUMENTS

| | | | | |
|---|---|---|---|---|
| DE | 4401894 A1 | * | 7/1995 | ............... B60K 1/02 |
| GB | 261530 A | * | 11/1926 | ............... E21C 35/00 |

* cited by examiner

*Primary Examiner* — Joshua Benitez-Rosario
*Assistant Examiner* — Jose Gonzalez Quinones
(74) *Attorney, Agent, or Firm* — Muncy, Geissler, Olds & Lowe, P.C.

(57) ABSTRACT

A work output device is revealed. The work output device includes two motor rotors respectively arrange at two ends of a horizontal main rotating shaft. An outer transmission shaft of each motor rotor starts rotating after the power is turned on. The rotating outer transmission shaft drives the main rotating shaft to rotate in one direction through a speed change gear mechanism. The motor rotors are synchronously driven to rotate around the main rotating shaft and move from a lower position to a higher position. At the moment, the power is turned off and the motor rotors turn back from the higher position to the lower position with the help of gravity. Thus a cycle of repetitive up-and-down half circle rotation is completed. Moreover, the main rotating shaft drives a work output shaft to rotate by a torque controller.

6 Claims, 4 Drawing Sheets

WORK OUTPUT DEVICE

BACKGROUND OF THE INVENTION

The present invention relates to a work output device, especially to a work output device that includes two motor rotors rotating a half circle up-and-down repetitively. The two motor rotors rotate from a lower position to a higher position when current is applied. When the power is off, the motor rotors turn back to the lower position. Thus a repetitive up-and-down half-circle rotation is performed by the work output device with stable rotating torque.

Natural sources on the earth including petroleum, coal, etc have been consumed dramatically after industrial resolution. With exhaustion of resources, nuclear energy has been used. However, nuclear energy and waste cause biological hazards and environmental impact. There is much fear of devastation due to main nuclear disasters and radioactive incidents occurred in recent years. Thus renewable energy such as wind, hydropower, tides, sunlight, etc is considered as an alternative fuel in future. Yet the development of the renewable energy and related techniques haven't matured enough to replace the petroleum completely. Thus energy saving is getting more important due to difficulties in development of new energy. In order to meet requirements of energy saving, there is a need to provide a work output device having stable rotating torque and providing better energy-saving effect and meeting requirements of more applications.

SUMMARY OF THE INVENTION

Therefore it is a primary object of the present invention to provide a work output device that includes two motor rotors rotating a half circle up-and-down repetitively. An outer transmission shaft of a first motor rotor of the two motor rotors starts rotating after the power being turned on. Thus a main rotating shaft is driven to rotate in a single direction through a speed change gear mechanism. The first motor rotor is synchronously driven to rotate around the main rotating shaft and move from a lower position of a circle to a higher position of the circle. The radius of the circle is defined by a support arm whose length is adjustable. Then the power is off and the first motor rotor turns back from the higher position to the lower position along the same half-circle pathway in opposite direction with the help of gravity. Thereby the first motor rotor rotates a half circle up-and-down repetitively. When the first motor rotor starts rotating from the higher position to the lower position, a second motor rotor of the two motor rotors moves in the same way as the first motor rotor, rotating from the lower position to the higher position. The second motor rotor also rotates a half circle up-and-down repetitively. By the repetitive up-and-down half circle rotation of the first motor rotor and the second motor rotor, the main rotating shaft is driven to rotate in a single direction. Through a torque controller, the main rotating shaft further drives a work output shaft to rotate. Thus the work output shaft outputs work with stable rotating torque.

DETAILED DESCRIPTION OF THE PREFERRED EMBODIMENT

Figure 1:
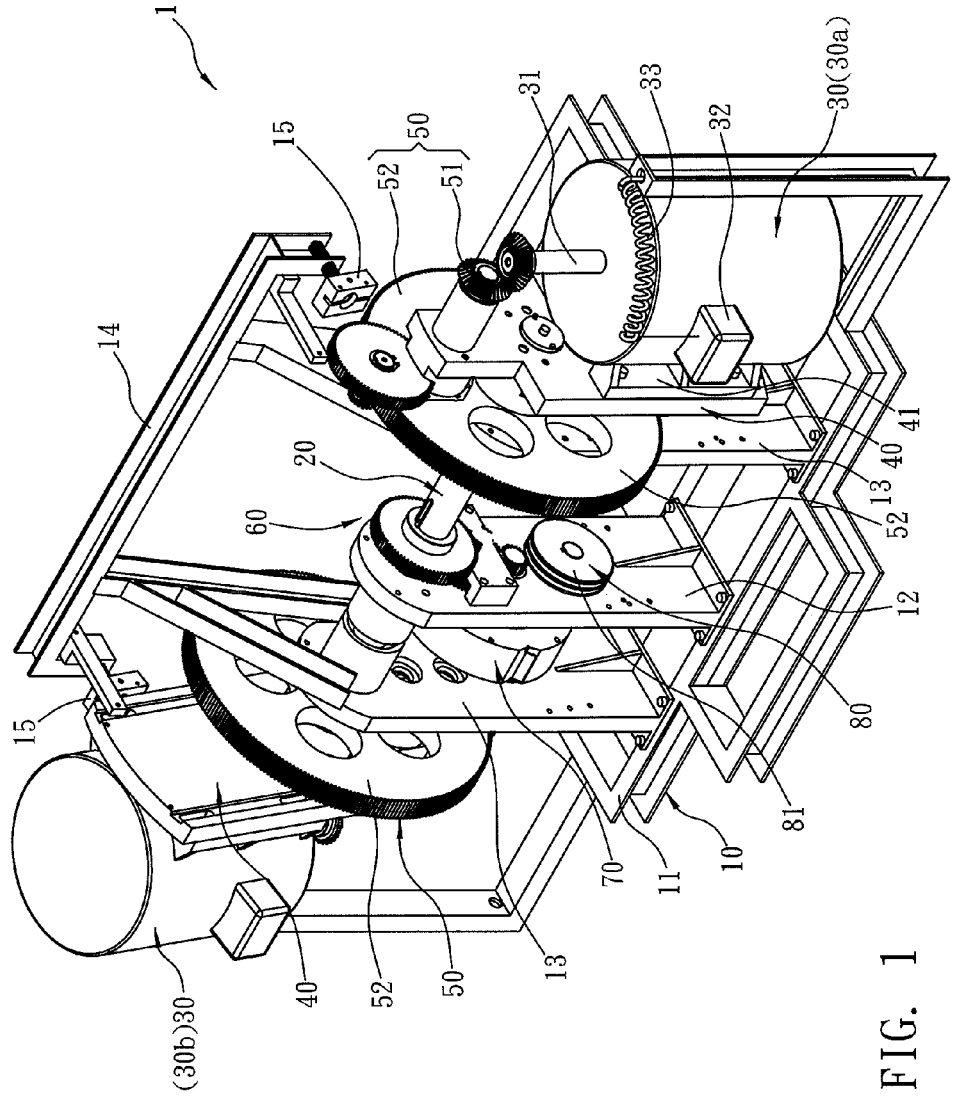
FIG. 1 is a right side perspective view of an embodiment according to the present invention.
Figure 2:
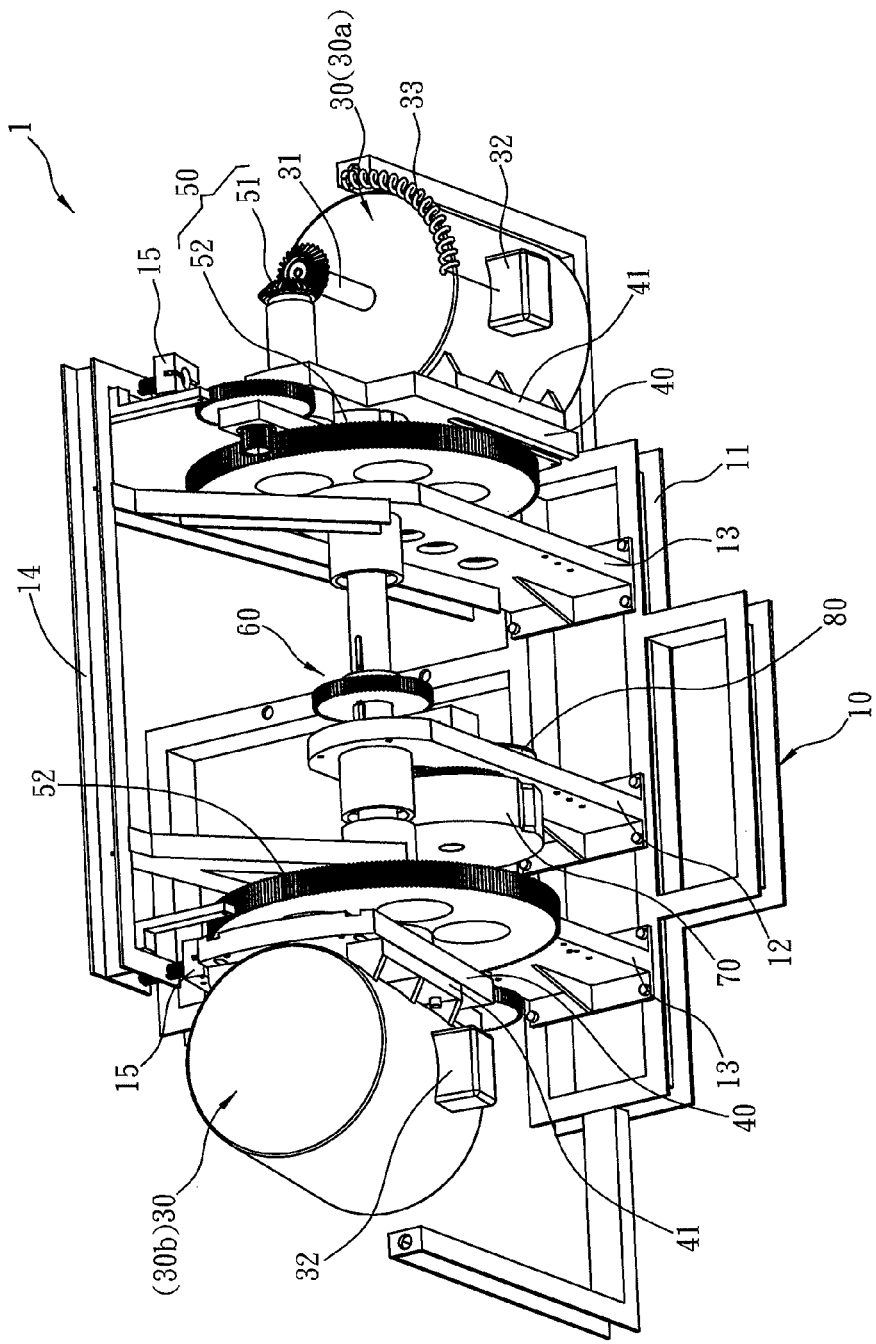
FIG. 2 is a left side perspective view of an embodiment according to the present invention.

Refer from FIG. 1 to FIG. 4, a work output device 1 of the present invention includes a support base 10, a main rotating shaft 20, two motor rotors 30, two support arms 40, two first speed change gear mechanism 50, a second speed change gear mechanism 60, a torque controller 70 and a work output shaft 80.

The support base 10 is used for supporting the components mentioned above (from 20 to 80). Moreover, the work output device 1 of the present invention can be moved conveniently and fixed on certain positions or occasions to be used by the support base 10 so that the present invention has more applications. In this embodiment, the support base 10 includes a bottom seat 11 on the bottom thereof, a middle plate 12 vertically arranged at a middle part of the bottom seat 11, two side plates 13 vertically disposed on the bottom seat 11 and located at the left side and the right side of the middle plate 12 respectively, and a rear frame 14 that is arranged at the rear side of the middle plate 12 and the two side plates 13. There is no limit on the structure of the support base 10. Moreover, a buffer part 15 is set at a high position on the right side and the left side of the rear frame 14.

The main rotating shaft 20 is a rotating shaft for storage of energy and is disposed horizontally over the middle plate 12 and the two side plates 13. The main rotating shaft 20 for storage of energy is a single-direction rotating shaft. For example, a ratchet mechanism is used to form the rotating shaft that rotates only in one direction. The internal mechanism of the main rotating shaft 20 for storage of energy can be designed by various types of mechanism to provide single-rotating function.

The two motor rotors 30 are respectively disposed on an outer side of each side plate 13 and located symmetrically on the left side and the right side of the main rotating shaft 20, as shown from FIG. 1 to FIG. 4. The motor rotor 30 can be a high efficiency motor. The motor rotor 30 uses an electric mechanism mounted therein to control an outer transmission shaft 31 for rotating in an alternating on-off manner. The outer transmission shaft 31 starts rotating when the power is on and stops rotating when the power is off. In this embodiment, the outer transmission shaft 31 of the motor rotor 30 is controlled by a switch control member 32. The switch control member 32 is electrically connected to outside by a flexible wire 33. The connection way and/or the control way mentioned above is not limited. While in use, the outer transmission shaft 31 of the motor rotor 30a on the right side (the first motor rotor 30a) is switched to a power-on state by the switch control member 32 and rotating a first half cycle when the motor rotor 30 is located at (or arriving) the lowest position (as shown from FIG. 1 to FIG. 4). When the motor rotor 30 is located at (or arriving) a high position (as shown from FIG. 1 to FIG. 4), the outer transmission shaft 31 of the motor rotor 30b on the left side (the second motor rotor 30b) is switched to a power-off state by the switch control member 32 and rotating the rest half cycle. The electric mechanical design of the switch control member 32 is known to people skilled in the art. In this embodiment, the motor rotor 30 is controlled to rotate a half circle in an alternating on-off manner. That means in the first half cycle, the motor rotor 30 is switched to a "power-on (conductive)" state for performing the half circle rotation and moving from the lower position to the higher position. In the other half cycle, the motor rotor 30 is switched to a "power-off (non-conductive)" state for stopping rotation and turns back from the higher position to the lower position along the same pathway by the gravity.

Figure 3:
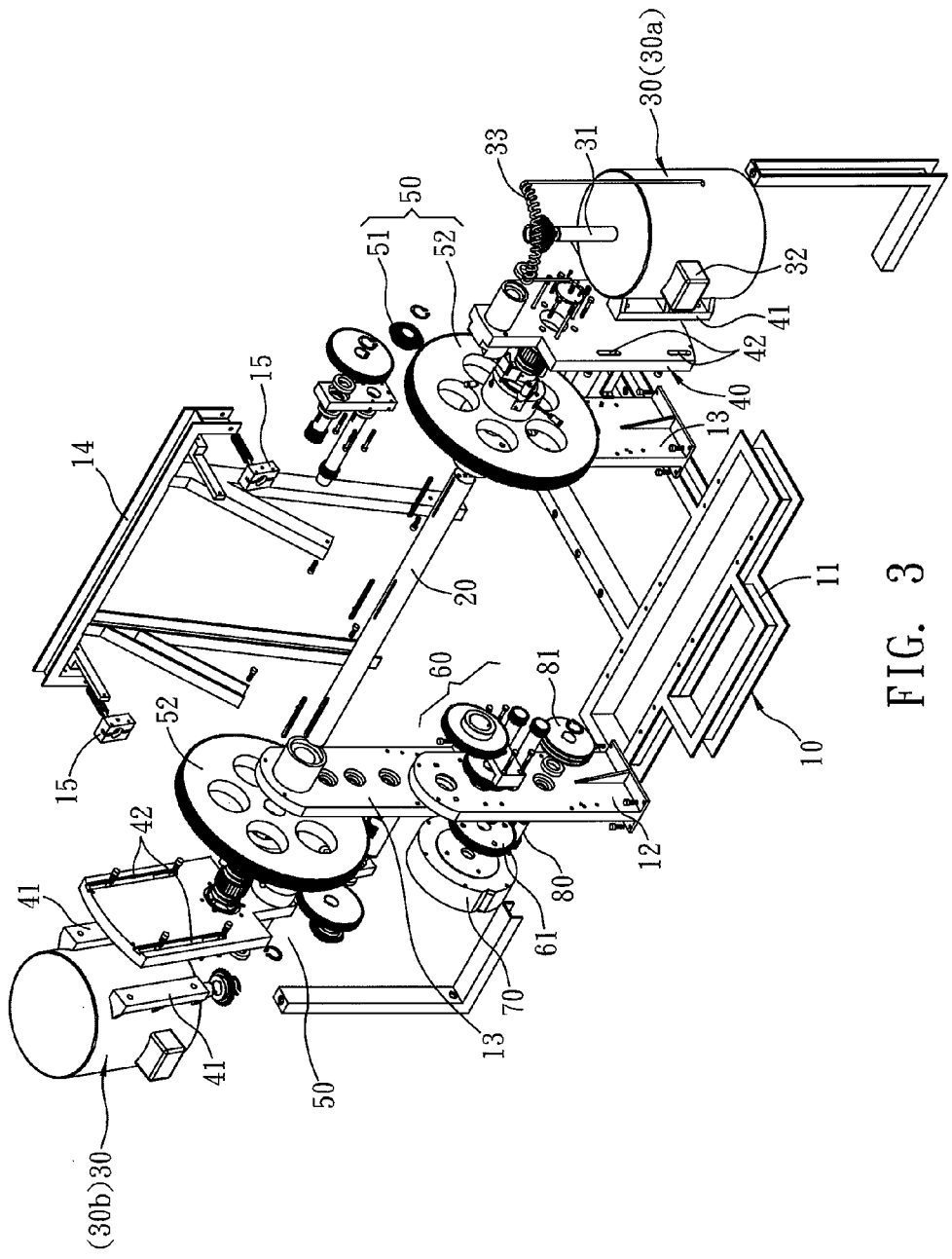
FIG. 3 is an explosive view of the embodiment in FIG. 1 according to the present invention.
Figure 4:
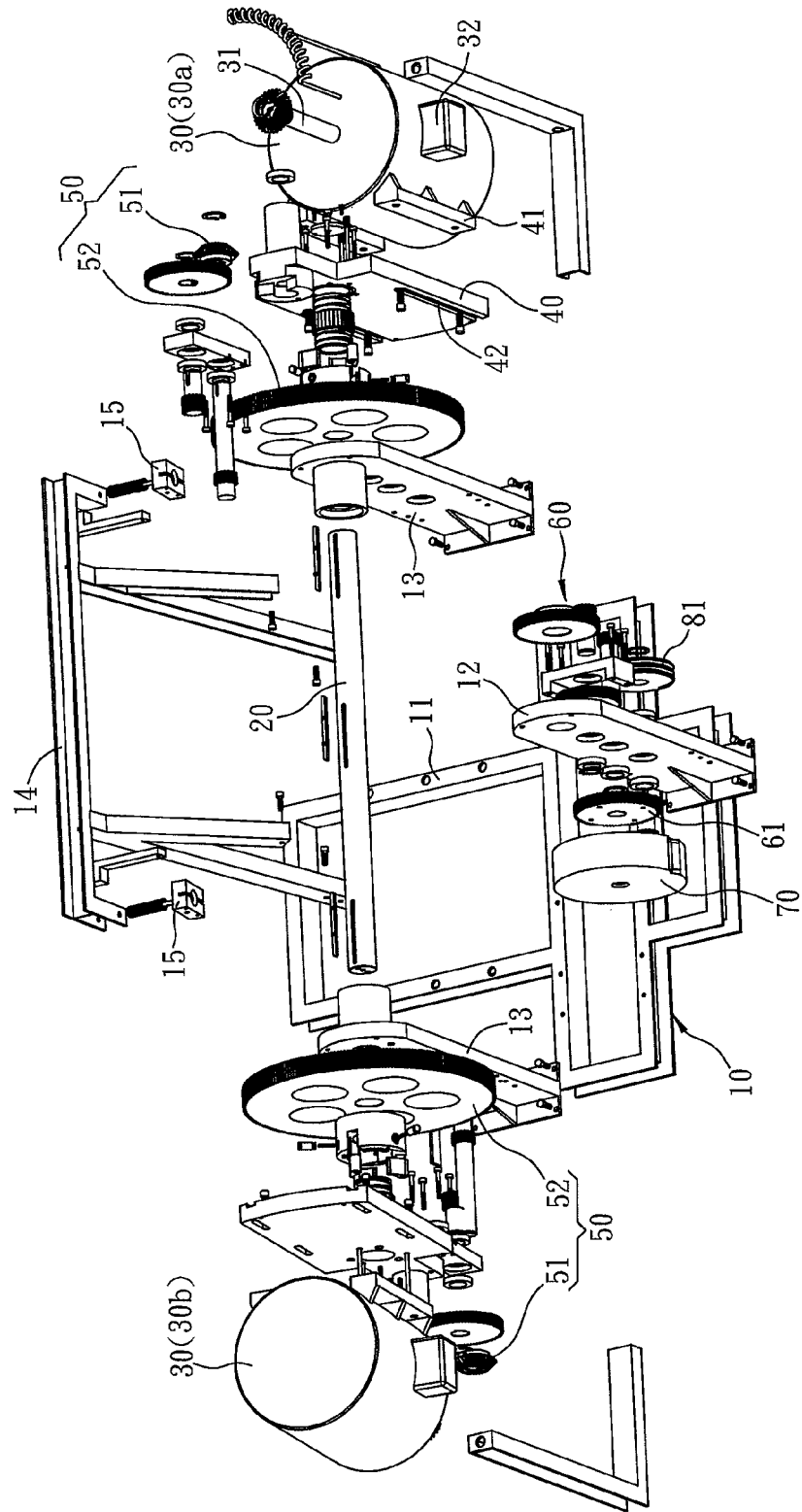
FIG. 4 is an explosive view of the embodiment in FIG. 2 according to the present invention.

The two support arms 40 are respectively connected to and mounted between each motor rotor 30 and the main rotating shaft 20. Thus the motor rotor 30 rotates a half circle around the main rotating shaft 20 (center of the circle) while the support arm 40 defines a radius of the circle. In this embodiment, the support arm 40 is for supporting the motor rotor 30 so that the motor rotor 30 performs a half-turn rotation around the main rotating shaft 20, moving between the lower position and the higher position of the circle. The position of each motor rotor 30 fixed on the support arm 40 can be adjusted radially. As shown in FIG. 3 and FIG. 4, a support rack 41 is disposed on a housing of each motor rotor 30 and a plurality of fastening holes 42 is arranged at the support arm 40. The fastening holes 42 are corresponding to the support rack 41 and used for radial adjustment. By fastening the support rack 41 on different fastening holes 42, the radius of the circle formed by the motor rotor 30 rotating around the main rotating shaft 20 can be adjusted. That means the support arm 40 is like an arm with adjustable length. When the motor rotor 30 rotates a half circle around the main rotating shaft 20 and a radius of the circle is defined by the support arm 40, the radius is able to be adjusted by the position of the support arm 40 in relative to the support rack 41. Thus the choices of the motor rotors 30 (such as high efficiency motor) used are increased and the work output device 1 is assembled more conveniently.

The first speed change gear mechanism 50 is connected to and arranged between the outer transmission shaft 31 of the motor rotor 30 and the main rotating shaft 20 and is formed by a plurality of gears with different sizes and connected to each other for providing speed change function. In this embodiment, the first speed change mechanism 50 further includes a start-end transmission gear 51 and a finish-end transmission gear 52. The start-end transmission gear 51 is connected to and driven by the outer transmission shaft 31 of the motor rotor 30 while the finish-end transmission gear 52 is connected to the main rotating shaft 20 so as to drive the main rotating shaft 20 rotating in one direction synchronously. While in use, the start-end transmission gear 51 is driven by the outer transmission shaft 31 of the motor rotor 30 to run at a high speed and the movement is transmitted to the finish-end transmission gear 52 due to the speed change function of the first speed change mechanism 50. Then the main rotating shaft 20 is driven by the finish-end transmission gear 52 to have a single-direction rotation at a lower speed.

Moreover, when the outer transmission shaft 31 of the motor rotor 30 is rotated at a high speed and the main rotating shaft 20 is rotated in the single direction at a low speed, the motor rotor 30 is synchronously rotated a half-turn around the main rotating shaft 20, along the circumference of the circle whose radius is defined by the support arm 40 due to connection of gears of the first speed change mechanism 50. That means the motor rotor 30 is rotated around the main rotating shaft 20 from a lower position of the circle (the position of the motor rotor 30a on the right side shown from FIG. 1 to FIG. 4) to a higher position (the position of the motor rotor 30b on the left side shown from FIG. 1 to FIG. 4) and against the buffer part 15 at the high position of the rear frame 14. Thus a first half-turn rotation from the lower position to the higher position is completed.

Once the motor rotor 30 is rotated to the higher position (the position of the motor rotor 30b on the left side shown from FIG. 1 to FIG. 4) after the half-circle rotation, the outer transmission shaft 31 of the motor rotor 30 is switched to stop rotating under the control of the switch control member 32.

Then the motor rotor 30 is moved from the higher position (the position of the motor rotor 30b on the left side shown from FIG. 1 to FIG. 4) and is turning back to the original lower position (the position of the motor rotor 30a on the right side shown from FIG. 1 to FIG. 4), along the previous half-turn pathway in the opposite direction. At this moment, during the turning back process, the motor rotor 30 is in an idle-running state in relative to the main rotating shaft 20, without affecting the single direction rotation of the main rotating shaft 20 due to the single direction rotation mode of the main rotating shaft 20 for storage of energy. Or if the motor rotor 30 is with a certain weight, the motor rotor 30 drives the main rotating shaft 20 to rotate in the original single direction by the gears of the first speed change mechanism 50 with the help of gravity during the turning back process. In this embodiment, the speed ratio (or gear ratio) of the outer transmission shaft 31 of the motor rotor 30 (or the start-end transmission gear 51) to the main rotating shaft 20 (or the finish-end transmission gear 52) is set about 12:1. For example, the speed of the main rotating shaft 20 (or the finish-end transmission gear 52) is 125 revolutions per minute (125 revs/min) when the speed of the outer transmission shaft 31 of the motor rotor 30 (or the start-end transmission gear 51) is set as 1500 revolutions per minute (1500 revs/min). The ratio is not limited to 12:1.

The second speed change mechanism 60 is connected to and arranged between the main rotating shaft 20 and the work output shaft 80 and having a plurality of gears with different sizes and connected to each other for providing speed change function. When the main rotating shaft 20 (or the finish-end transmission gear 52) is rotating at a certain speed such as 125 rpm, the work output shaft 80 is driven to rotate at a preset speed by the second speed change mechanism 60 with the speed change function. Thus work is output to drive a load connected to the work output shaft 80 to rotate. In this embodiment, the work output shaft 80 is coaxially connected to a pulley 81 or is arranged with a vane wheel (not shown in figure) as a load, but the load is not limited to the devices mentioned above.

The torque controller 70 is arranged between the second speed change mechanism 60 and the work output shaft 80. The torque controller 70 is used to make the work output shaft 80 maintain a stable rotating torque for output work. The torque controller 70 can be formed by a torque spring with certain strength and connected to a rotating shaft of a gear 61 of the second speed change gear mechanism 60, as shown in FIG. 3 and FIG. 4. Thus the work output shaft 80 is driven to rotate continuously and stably by a stable rotating torque of the gear 61 of the second speed change gear mechanism 60.

When the work output device 1 of the present invention starts moving in a cycle, the movement cycle of each motor rotor 30 is divided into a first half cycle and the rest half cycle. The movement of the first motor rotor 30a (the motor rotor 30a on the right side shown from FIG. 1 to FIG. 4) and the second motor rotor 30b (the motor rotor 30b on the left side shown from FIG. 1 to FIG. 4) during the first half cycle and the rest half cycle is described in details in the following.

<1> When the first motor rotor 30a starts entering the first half cycle of the half-circle rotation, the second motor rotor 30b enters the rest half cycle of the half-circle rotation. While entering the first half cycle, the first motor rotor 30a is switched to the "power-on (conductive)" state so as to make the outer transmission shaft 31 start rotating. Now the first motor rotor 30a drives the main rotating shaft 20 (the finish-end transmission gear 52) to rotate in one direction at low speed by a driving force of the outer transmission shaft 31 and the speed change function of the first speed change mechanism 50. By the gears of the first speed change mechanism 50, the motor 30 also synchronously rotates around the main rotating shaft 20, moving from a lower position (as the position of the first motor rotor 30a on the right side shown in FIG. 1 and FIG. 2) to a higher position (as the position of the second motor rotor 30b on the left side shown in FIG. 1 and FIG. 2). Thus a half-circle rotation (or the first half cycle) is completed. After arriving the higher position, the first motor rotor 30a is in contact with the buffer part 15 on the rear frame 14 so as to reduce the impact force. Then the rest half cycle starts.

As to the second motor rotor 30b, it enters the rest half cycle of the half-circle rotation at this moment. The second motor rotor 30b is switched to the "power-off (non-conductive)" state under the control of the switch control member 32 so that the outer transmission shaft 31 of the second motor rotor 30b stops rotating. Due to that the outer transmission shaft 31 of the second motor rotor 30b already stops rotating, the second motor rotor 30b drives the main rotating shaft 20 (the finish-end transmission gear 52) to rotate in one preset direction synchronously with the help of gravity acted thereon. By weight of the second motor rotor 30b and the gears of the first speed change mechanism 50, the second motor rotor 30b turns back from the higher position (as the position of the second motor rotor 30b on the left side shown in FIG. 1 and FIG. 2) to the lower position (as the position of the first motor rotor 30a on the right side shown in FIG. 1 and FIG. 2). Thus a half-circle rotation (or the rest half cycle) is completed. Then the second motor rotor 30b starts the first half cycle of the next circle.

<2> When the first motor rotor 30a starts entering the rest half cycle of the half-circle rotation, the second motor rotor 30b enters the first half cycle of the half-circle rotation. At the moment, the rest half cycle of the half-circle rotation of the first motor rotor 30a is the same as the rest half cycle of the half-circle rotation of the second motor rotor 30b in opposite direction mentioned above. As to the second motor rotor 30b that enters the first half cycle of the half-circle rotation, the rotating way is the same as the first half cycle of the half-circle rotation of the first motor rotor 30a in clockwise direction mentioned above.

In summary, each motor rotor 30 including the first motor rotor 30a and the second motor rotor 30b is moved from a lower position to a higher position by rotating force of the outer transmission shaft 31 at the conductive state and the gravity at the power-off state. Then the motor rotor 30 moves along the same half-circle pathway in opposite direction and turns back to the original low position. The motor rotor 30 including the first motor rotor 30a and the second motor rotor 30b rotates a half circle up-and-down repetitively. When the second motor rotor 30b starts moving from a higher position to a lower position, the first motor rotor 30a raises from a lower position to a higher position. The two motor rotors 30a, 30b respectively rotate in a half circle up-and-down repetitively. For example, there is a half-circle time difference between the two motor rotors 30a, 30b but the time difference is not limited to the half-circle. Thus the main rotating shaft 20 is driven by repetitive up-and-down half-circle rotation of the first and the second motor rotors 30a, 30b to rotate in the single direction continuously.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:
1. A work output device comprising:
a support base used for supporting the work output device;
a main rotating shaft that is disposed horizontally over the support base and is a single-direction rotating shaft rotating in one direction over the support base;
two motor rotors including a first motor rotor and a second motor rotor respectively disposed on a left side and right side of the main rotating shaft; the first motor rotor and the second motor rotor respectively control an outer transmission shaft to rotate by electric mechanism mounted therein and the outer transmission shaft rotates a half cycle in an alternating on-off manner;
two support arms that are respectively disposed between the motor rotor and the main rotating shaft, and used for supporting the motor rotor so that the motor rotor rotates a half circle around the main rotating shaft up-and-down repetitively, moving between a lower position and a higher position at the circle whose radius is defined by the support arm; the support arm is arranged with a plurality of fastening holes radially corresponding to the main rotating shaft; a radial distance between the motor rotor and the main rotating shaft is able to be adjusted by the motor rotor being fastened on different fastening hole;
two first speed change gear mechanisms that are respectively connected to and arranged between the outer transmission shaft of the motor rotor and the main rotating shaft and having a plurality of gears with different sizes, a start-end transmission gear connected to the outer transmission shaft of the motor rotor and a finish-end transmission gear connected to the main rotating shaft; thereby the finish-end transmission gear drives the main rotating shaft to rotate in a single direction at a low speed while the start-end transmission gear is driven by the outer transmission shaft of the motor rotor at a high speed; when a power is on, the outer transmission shaft of the motor rotor is rotated at a high speed and the main rotating shaft is rotated in the single direction at a low speed; the motor rotor is synchronously rotated a half-circle around the main rotating shaft and a radius of the circle is defined by the support arm due to connection of the gears of the first speed change mechanism; the motor rotor is rotated around the main rotating shaft from a lower position of the circle to a higher position of the circle and a first half circle rotation is completed; after the motor rotor being moved to the higher position, the outer transmission shaft of the motor rotor is switched to a power-off state to stop rotating; then the motor rotor turns back from the higher position to the lower position along a pathway of the first half circle rotation in opposite direction with help of gravity;
a second speed change gear mechanism formed by a plurality of gears with different sizes, disposed between the main rotating shaft and a work output shaft and used to make the rotating main rotating shaft drive the work output shaft to rotate continuously; and
the work output shaft that is connected to the main rotating shaft by the second speed change gear mechanism and is used for output work;
wherein the first motor rotor is switched to a power-on state to make the outer transmission shaft thereof start rotating when the first motor rotor enters a half circle rotation of a first half cycle; by a driving force of the outer transmission shaft and connection of the gears of the first speed change gear mechanism, the first motor rotor synchronously rotates around the main rotating shaft and moves from a lower position to a higher position so as to complete the half circle rotation of the first half cycle in clockwise direction; then the first motor rotor enters a half circle rotation of the rest half cycle in counterclockwise direction; a cycle of repetitive up-and-down half circle rotation is completed;

wherein when the first motor rotor enters the half circle rotation of the first half cycle in clockwise direction, the second motor is switch to a power-off state and an outer transmission shaft of the second motor stops rotating; then the second motor rotor synchronously turns back from the higher position to the lower position by gravity and connection of the gears of the first speed change gear mechanism so as to complete a half circle rotation of the rest half cycle in counterclockwise direction; next the second motor rotor enters a half circle rotation of a first half cycle in clockwise direction; a cycle of repetitive up-and-down half circle rotation is completed.

2. The device as claimed in claim 1, wherein there is a time difference equal to a half circle between the first motor rotor and the second rotor that rotate a half circle up-and-down repetitively.

3. The device as claimed in claim 1, wherein a torque controller is arranged between the second speed change mechanism and the work output shaft; the torque controller is connected to a rotating shaft of a gear of the second speed change gear mechanism so that the gear drives the work output shaft 80 to rotate by a stable rotational/rotating torque.

4. The device as claimed in claim 1, wherein a speed ratio of the outer transmission shaft of the motor rotor to the main rotating shaft is 12:1.

5. The device as claimed in claim 1, wherein the support base includes a bottom seat on a bottom thereof, a middle plate vertically arranged at a middle part of the bottom seat, two side plates vertically disposed on the bottom seat and located at the left side and the right side of the middle plate respectively, and a rear frame that is arranged behind the middle plate and the two side plates.

6. The device as claimed in claim 1, wherein a buffer part is disposed on the support base so that the motor rotor is against the buffer part while rotating to a high position.

\* \* \* \* \*